US006497914B1

(12) United States Patent
Hidaka et al.

(10) Patent No.: US 6,497,914 B1
(45) Date of Patent: Dec. 24, 2002

(54) OIL-AND-FAT FEEDSTOCK FOR PRODUCTION OF CREAM AND LOW-OIL CREAM COMPOSITION

(75) Inventors: Hiroshi Hidaka, Sakai (JP); Masaaki Miyabe, Hannan (JP); Naomi Iwai, Sakai (JP); Yoshitaka Ebihara, Sakai (JP); Tugio Izumi, Sennan-gun (JP)

(73) Assignee: Fuji Oil Co., Ltd., Osaka (JP)

( * ) Notice: Subject to any disclaimer, the term of this patent is extended or adjusted under 35 U.S.C. 154(b) by 0 days.

(21) Appl. No.: 08/193,028

(22) PCT Filed: Aug. 30, 1993

(86) PCT No.: PCT/JP93/01219

§ 371 (c)(1),
(2), (4) Date: Feb. 3, 1994

(87) PCT Pub. No.: WO95/06413

PCT Pub. Date: Mar. 9, 1995

Related U.S. Application Data

(63) Continuation-in-part of application No. 07/993,045, filed on Dec. 18, 1992, now abandoned.

(30) Foreign Application Priority Data

Dec. 18, 1991 (JP) ............................................. 3-354629

(51) Int. Cl.$^7$ ............................................. A23C 11/04
(52) U.S. Cl. ...................... 426/570; 426/602; 426/607; 426/585; 426/586
(58) Field of Search ................................ 426/606, 607, 426/585, 570, 572, 617, 586, 602

(56) References Cited

U.S. PATENT DOCUMENTS

| | | | | |
|---|---|---|---|---|
| 2,941,888 A | * | 6/1960 | Dolman | 426/617 |
| 4,098,912 A | * | 7/1978 | Mercado-Flores | 426/617 |
| 4,341,812 A | * | 7/1982 | Ward | 426/607 |
| 4,360,535 A | * | 11/1982 | Darling | 426/570 |
| 4,366,181 A | * | 12/1982 | Dykshoorn | 426/607 |
| 4,375,485 A | * | 3/1983 | van Gennip | 426/570 |
| 4,386,111 A | * | 5/1983 | Van Heteren | 426/607 |
| 4,478,867 A | * | 10/1984 | Zobel | 426/570 |
| 4,547,385 A | * | 10/1985 | Lindstom | 426/570 |
| 4,556,574 A | * | 12/1985 | Andersson | 426/570 |
| 4,610,889 A | * | 9/1986 | Schmidt | 426/607 |
| 4,702,928 A | * | 10/1987 | Wieske | 426/607 |
| 4,721,626 A | * | 1/1988 | Rule | 426/607 |
| 4,861,611 A | * | 8/1989 | Baba | 426/607 |
| 5,135,768 A | * | 8/1992 | Campbell | 426/585 |
| 5,147,676 A | * | 9/1992 | Talbot | 426/607 |
| 5,149,557 A | * | 9/1992 | Morrison | 426/585 |
| 5,151,291 A | * | 9/1992 | Tokairin | 426/607 |
| 5,151,292 A | * | 9/1992 | Zwikstra | 426/607 |

FOREIGN PATENT DOCUMENTS

| | | |
|---|---|---|
| EP | 0 294 119 | 12/1988 |
| GB | 2 205 726 | 12/1988 |
| JP | 63-291550 | 11/1988 |
| JP | 64-55155 | 3/1989 |
| JP | 2-132191 | 5/1990 |
| JP | 5-30911 | 2/1993 |

OTHER PUBLICATIONS

Barleys Industrial Oil and Fat Products vol. 1 Fourth Ed. John Wiley & Sons New York 1979 p 311–317, 322–327.*
Patent Abstracts of Japan, vol. 8, No. 52 (C–213), Mar. 9, 1984.
Database WPI, Week 7732, Derwent Publications Ltd., London, GB; AN 77–56773Y.
Patent Abstracts of Japan, vol. 18, No. 150 (C–1179), Mar. 14, 1994.
Patent Abstracts of Japan, vol. 17, No. 663 (C–1138), Dec. 8, 1993.

* cited by examiner

Primary Examiner—Carolyn Paden
(74) Attorney, Agent, or Firm—Wenderoth, Lind & Ponack, L.L.P.

(57) ABSTRACT

There is provided a low oil cream composition which does not require a large amount of any particular emulsifying agent but has good physical properties after the whipping as well as good flavor and melting property in the mouth, even a low oily ingredient content such as not greater than 40%, and also provides is an oil-and-fat feedstock for production of the cream composition.

The oil-and-fat feedstock for production of the cream composition is obtained by formulating not less than 30% of SUS-type triglycerides and 5 to 60% of a lauric-type oil-and-fat ingredient. A low-oil cream composition can be produced by the feedstock alone or, by further adding a cream containing milk fat to the cream. Then, it is possible to provide a low-oil cream composition having flavor and body comparable with fresh cream and to provide a process for production thereof.

8 Claims, No Drawings

US 6,497,914 B1

OIL-AND-FAT FEEDSTOCK FOR PRODUCTION OF CREAM AND LOW-OIL CREAM COMPOSITION

This application is a continuation-in-part of now abandoned application Ser. No. 07/993,045, filed Dec. 18, 1992, now abandoned and the National Stage of PCT/JP93/01219, filed Aug. 30, 1993.

FIELD OF THE INVENTION

The present invention relates to an oil-and-fat feedstock for production of cream by a specific formulation with particular physical properties. It also relates to a low-oil cream composition produced from such an oil-and-fat feedstock.

BACKGROUND OF THE INVENTION

In recent years, there has been a demand in the field of food industry on the development of low-caloric, light and soft food with varying the habit of eating and with increasing the intention of health.

Although fresh cream obtained from fresh milk is excellent in view of its flavor, body and the like, it has a very high fat content and is not necessarily suitable in veiw of the recent demand for the development of low-caloric food. In addition, fresh cream has unstable physical properties and is expensive.

It has been proposed to produce whipping cream having stable physical properties from vegetable fats and oils. By using such whipping cream, it is possible to produce food of lower caloric value than that obtained with fresh cream. However, such whipping cream does not ordinarily exhibit stable physical properties after whipping, if the content of oily ingredients is not greater than 40%, based on the total weight of the cream. Therefore, attempts to decrease the content of oily ingredients have been made for the purpose of attaining a light flavor a decrease in and calories. That is, JP-B 62-118855, JP-B 63-32421, JP-A 64-51054 and the like disclose various methods in which a particular emulsifying agent is added to cream in a great amount. Also, a process for producing low-oil cream is proposed in JP-A 2-100646 by adjusting the amount of lauric-type oil-and-fat ingredient and solid fat content (SFC) in cream.

DISCLOSURE OF THE INVENTION

Problems to be Solved by the Invention

However, these kinds of whipping low-oil cream have the following disadvantages. For example, in the case of cream characterized by the use of an emulsifying agent, the addition of a selected particular emulsifying agent to the cream in great amounts is required for the purpose of attaining stable physical properties of the cream. Even if the physical properties of the cream are said to be stable, this only means that the texture of the cream is achieved with air bubbles held as a result of the function of the emulsifying agent. Such a kind of cream has only a small portion of the original good taste provided by oil, and the flavor thereof is significantly deteriorated by the addition of an emulsifying agent in great amounts.

In the low-oil creamy oil-and-fat composition disclosed in JP-A 2-100646, the solid fat content (SFC) of oily ingredients contained therein is not less than 50% at 5° C. and 30% to 40% at 15° C. Such oily ingredients exhibit a relatively gentle curve of the solid fat content (SFC); therefore, even if a cream composition is produced using these oily ingredients and then whipped, it is difficult to obtain whipped cream having sharp melting properties in the mouth and cool feeling. This composition exhibits poor shape retention when left to stand at room temperature. Further, with a decrease in the oily-ingredient content, the physical properties of the composition, such as over-run after the whipping and capability of making artificial flowers (decorations) are seriously deteriorated.

One object of the present invention is to provide a low-oil cream composition which does not require the use of a great amount of a selected particular emulsifying agent, even if the oily-ingredient content is low, has good over-run after whipping and capable of making artificial flowers, exhibits good stability at room temperature and possesses an excellent flavor as well as excellent and melting properties in the mouth. Also provided is an oil-and-fat feedstock for production of the cream composition.

As described hereinafter, it has been found that the above problems can be solved by combining certain amounts of lauric-type oil-and-fat ingredient and SUS-type triglycerides in oily ingredients. In addition, it has also been found that, when fresh cream (cream containing milk fat) is added to feedstocks so as to provide the flavor and body of fresh cream, the properties of the whipped cream are deteriorated in respect to artificial flower making capablility and shape retention.

Another object of the present invention is to provide a low-oil cream composition containing milk fat which has good shape retention after the whipping and has excellent capability for making artificial flowers as well as good flavor and possesees a body comparable to fresh cream.

Means for Solving the Problems

In general, conventional oily ingredients having a high content of SUS-type triglycerides are disadvantageous in that any cream composition prepared therefrom has quite poor emulsion-stability and has a tendency to cause the so-called "thickening (plasticization)". It has, therefore, been said so far that the conventional oily ingredients are unfavorable as the raw materials of whipping cream.

However, the present inventors have studied in detail the original function of oily ingredients, and found that the above-described problems can be solved by combining a lauric-type oil-and-fat ingredient with the conventional oily ingredients which are rich in SUS-type triglycerides. Further, they have succeeded in obtaining, with the use of such a mixture of oily ingredients, a low-oil cream composition having good whipping properties, excellent stability at room temperature, as well as extremely good flavor and melting properties in the mouth.

That is, one aspect of the present invention relates to an oil-and-fat feedstock for the production of cream, which comprises SUS-type triglycerides at an amount of at least 25% and a lauric-type oil-and-fat ingredients in an amount of from 5% to 60% based on the total weight of the oily ingredients, and a low-oil cream composition produced by using the feedstock.

The present inventors have further studied a combination of the oil-and-fat feedstock comprising a mixture of oily ingredients rich in SUS-type triglycerides and a lauric-type oil-and-fat ingredient with fresh cream. As a result, they have succeeded in obtaining a low-oil cream composition having good whipping properties, excellent stability at room temperature, as well as extremely good flavor and body, which is comparable to natural fresh cream, by mixing a separately prepared emulsion of the above-described particular oily ingredients and fresh cream (cream containing milk fat) rather than emulsification of all feedstocks of cream together, i.e., with prevention of the integration of all or most all of the oily particles in the respective ingredients.

That is, another aspect of the present invention relates to a low-oil cream composition which comprises a mixture of an emulsion comprising SUS-type triglycerides at an amount of at least 25% and a lauric-type oil-and-fat ingredient at an amount of from 5% to 60% in the oily ingredients [hereinafter sometimes abbreviated as Emulsion (A)] and an emulsion comprising milk fat [hereinafter sometimes abbreviated as Emulsion (B)] and, based on the total weight of the oily ingredients, the content of SUS-type triglicerides being at least 20%, the content of a lauric-type oil-and-fat being from 5% to 60% and the content of milk fat being from 5% to 25%. All the percents used herein relating to the amount of the ingredients are by weight.

As used herein, the term "cream" or "cream composition" refers to an oil-in-water (O/W) type or water-in-oil-in-water type (W/O/W) emulsion having whipping properties which contains base materials such as oily ingredients, proteins, water and other ingredients. Such cream or cream composition may also be called "whipping cream". When this cream composition is whipped so as to hold air bubbles therein, with a whipping tool or an exclusive mixer, it will become "whipped cream", so called in general.

Similarly, Emulsion (A) and (B) of the present invention contain oily ingredients, proteins, water and other ingredients.

Hereinafter the present invention is further illustrated in detail.

The oil-and-fat feedstock for production of cream according to the present invention is characterized in that it is composed mainly of a lauric-type oil-and-fat ingredient and an oily ingredient rich in SUS-type triglycerides.

Examples of the oily ingredient rich in SUS-type triglycerides (2-unsaturated-1,3-disaturated triglycerides) are palm oil, illipe butter, shea butter, hardened or fractioned oil-and-fat ingredients thereof, or interesterified oil-and-fat ingredients obtained by introducing saturated fatty acids at the 1- and 3-positions of triglycerides contained in oily ingredients rich in unsaturated fatty acids at the 2-position of the triglycerides. The fatty acid residues thereof have from 8 to 22 carbon atoms (they may contain a small amount of short-chain fatty acids). Examples of the 2-unsaturated fatty acids are oleic acid, linoleic acid and linolenic acid.

Examples of the lauric-type oil-and-fat ingredients are coconut oil, palm kernel oil, or hardened, fractioned or interesterified oil-and-fat ingredients thereof.

The oily ingredients of Emulsion (A) contain preferably at least 25%, more preferably at least 35% of SUS-type triglycerides. Further, the lauric-type oil-and-fat is added at an amount of from 5 to 60%. When SUS-type triglycerides are too little, or the lauric-type oil-and-fat is too much, it is difficult to whip the cream composition finally obtained. When the lauric-type oil-and-fat is too little, the emulsion is liable to be broken during the production steps. In addition, a small amount of other oily ingredients can be added. However, preferably, the solid fat content (SFC) in the oily ingredients of Emulsion (A) is not less than 50% at 5° C. and not less than 40% at 15° C. so as to provide sharp melting properties at about body temperature.

The cream composition of the present invention has an oily-ingredient content of not greater than 40%, preferably 10% to 35%, based on the total weight of the composition.

For using Emulsion (A) together with Emulsion (B), the amount of oily ingredients in Emulsion (A) is preferably at most 35%, more preferably form 10 to 35%. When the amount of oily ingredients in Emulsion (A) exceeds 35% and fresh cream, which normally has a high oily ingredient content is used together, the total amount of oily ingredients of a cream composition becomes too high and the composition is liable to cause thickening.

Typical examples of proteins to be used in Emulsion (A) are milk powders such as skimmed milk powder and whole milk powder, thick beast milk and the like. They provide the composition with milk flavor. In general, as solids-not-fat, they are used at an amount of 3% to 8%, preferably 4% to 7% based on the total weight of Emulsion (A).

Emulsion (A) may further contain various salts and an emulsifying agent. As the salts, conventional salts for use in cream, such as alkali metal salts of phosphoric acid or those of citric acid, can be used. As the emulsifying agent, any of conventional emulsifying agents, such as soybean lecithin, diacetyl tartrate monoglyceride, sucrose fatty acid esters, polyglycerol fatty acid esters and sorbitan fatty acid esters, can be used. In particular, when diacetyl tartrate monoglyceride is used, the low-oil cream composition having better over-run and mouthfeel can be obtained. The amounts of these ingredients to be added may be as small as about 0.1% for the salts and about 1% for the emulsifying agent, based on the total weight of Emulsion (A).

Emulsion (A) can be produced according to an ordinary process for production of filled cream or imitation cream. That is, the above respective ingredients of Emulsion (A) can be emulsified by a conventional emulsification technique. However, it is desired to carry out the emulsification under such conditions that oily particles become as fine as possible rather than those for a mere pre-emulsification. Normally, the emulsification is carried out by, after pre-emulsification, further subjecting Emulsion (A) to homogenization according to a conventional technique. When the above ingredients are mixed with fresh cream and other ingredients without carrying out this emulsification, even if homogenization is carried out afterwards, it is difficult to whip the emulsified product obtained, or the shape retention and capability of making artificial flowers thereof after the whipping are deteriorated, and the product has poor flavor and does not possess the body of fresh cream. The homogenization may be either so-called pre-homogenization or post-homogenization which is carried, out before or after pasteurization or sterilization, or may be two-step homogenization as a combination of both. The pasteurization or sterilization can be carried out according to a conventional technique, for example, by ultra-high-temperature (UHT) sterilization for several seconds. However, it is not essential to carry out the pasteurization or sterilization during the preparation of Emulsion (A).

Emulsion (B) may be fresh milk, so-called fresh cream obtained by concentration and separation from milk and, usually, it is commercially available. In many cases, the oily ingredient content of fresh cream is 45 to 47% but the oily ingredient content of fresh cream is not specifically limited thereto. Emulsion (B) may be cream reconstituted by adjusting the oily ingredient content with milk solids such as milk fat, whole milk powder, skimmed milk powder and the like to the desired content.

Then, Emulsion (B) is mixed with Emulsion (A). The mixing ratio can be suitably selected. Preferably, the mixing ratio is adjusted so that the total oily ingredient content in the cream finally becomes not more than 40%, preferably 10 to 35%, and that, in the total oily ingredients of the cream, the SUS-type triglyceride content is not less than 20%, the lauric-type oil-and-fat ingredient content is 5 to 60% and the milk fat content is 5 to 25%. If the SUS-type triglyceride content and the lauric-type oil-and-fat ingredient content are outside these ranges, the desired effect obtained by limiting these oily ingredients as explained with respect to the above-described Emulsion (A) is scarcely expected. In addition, if the milk fat content is less than 5%, poor flavor and body is provided, although no influence on physical properties of cream is observed. On the other hand, if it exceeds 25%, whipping properties and shape retention after the whipping are deteriorated.

In the case that Emulsion (B) has been pasteurized of sterilized and, in so far as the Emulsion (A) has been emulsified, they may be mixed with each other in any step and then, preferably, the mixture is homogenized. More preferably, after pasteurization or sterilization and homogenization of Emulsion (A), they are aseptically mixed.

Then, according to a conventional method, cooling and aging are carried out to obtain the desired low-oil cream composition.

Best Mode for Working of the Invention

Hereinafter, as embodiments of the present invention, low-oil cream compositions were produced according to the formulations illustrated in each Example. In addition, the cream compositions before whipping were incubated at 20° C. for 2 hours, and then stirred for 5 minutes, followed by evaluation for the occurrence of thickening, over-run after the whipping, shape retention at 5 to 20° C. and the like. Whipping was carried out with Kenwood mixer. The results of comparative experiments are illustrated in each Comparative Examples.

Each Example is illustrated as a mere example and is not to be construed to limit the scope thereof. It should be noted that parts, ratios and percents (%) as used therein are all by weight.

EXAMPLE 1

A mixture of oily ingredients of palm mid-fraction (melting point: 34° C.; 60 parts) and hardened coconut oil (40 parts) was used as an oil-and-fat feedstock for production of cream (*). This oil-and-fat feedstock contained 49.2% of SUS-type triglycerides and its SFC was 70% at 5° C. and 55% at 15° C.

According to the formulation as described below, an oily phase obtained by adding an emulsifying agent to the above oily ingredients was mixed with an aqueous phase obtained by adding milk solids and salts to water, and the mixture was pre-emulsified in a high-speed mixer at 70° C. for 20 minutes. The resulting pre-emulsified emulsion was homogenized under pressure of 150 kg/cm² or lower, and then subjected to ultra-high-temperature (UHT) sterilization for about several seconds. Then, the emulsion was further homogenized under pressure of 150 kg/cm² or lower, and then cooled down, followed by aging for about 24 hours, resulting in a low-oil cream composition.

| Formulation | |
|---|---|
| Oil-and-fat ingredients* | 35.0% |
| Soybean lecithin | 0.3% |
| Diacetyl tartrate monoglyceride (HLB9) | 0.2% |
| Water | 57.8% |
| Skimmed milk powder | 6.5% |
| Alkali metal salts of phosphoric acid | 0.1% |

EXAMPLE 2

A mixture of illipe oil (60 parts) and hardened coconut oil (40 parts) was used as an oil-and-fat feedstock for production of cream (*). This oil-and-fat feedstock contained 51.0% of SUS-type triglycerides and its SFC was 78% at 5° C. and 60% at 15° C.

According to the formulation as described below, a low-oil cream composition was produced in the same manner.

| Formulation | |
|---|---|
| Oil-and-fat ingredients* | 30.0% |
| Soybean lecithin | 0.3% |
| Diacetyl tartrate monoglyceride (HLB9) | 0.2% |
| Sorbitan fatty acid ester (HLB5) | 0.2% |
| Water | 62.8% |
| Skimmed milk powder | 6.5% |
| Alkali metal salts of phosphoric acid | 0.1% |

EXAMPLE 3

A mixture of palm mid-fraction (melting point: 34C; 85 parts) and hardened coconut oil (15 parts) was used as an oil-and-fat feedstock for production of cream (*). This oil-and-fat feedstock contained 70.0% of SUS-type triglycerides and its SFC was 72% at 5° C. and 62% at 15° C.

According to the formulation as described below, a low-oil cream composition was produced in the same manner.

| Formulation | |
|---|---|
| Oil-and-fat ingredients* | 20.0% |
| Soybean lecithin | 0.3% |
| Sucrose fatty acid ester (HLB11) | 0.2% |
| Glycerol fatty acid monoester (HLB5) | 0.2% |
| Water | 72.2% |
| Skimmed milk powder | 7.0% |
| Alkali metal salts of phosphoric acid | 0.1% |

EXAMPLE 4

A mixture of fractioned shea butter (45 parts) and palm kernel oil (melting point: 36° C.; 55 parts) was used as an oil-and-fat feedstock for production of cream (*). This oil-and-fat feedstock contained 35.0% of SUS-type and its SFC was 70% at 5° C. and 62% at 15° C.

According to the formulation as described below, a low-oil cream composition was produced.

| Formulation | |
|---|---|
| Oil-and-fat ingredients* | 20.0% |
| Soybean lecithin | 0.3% |
| Sucrose fatty acid ester (HLB11) | 0.2% |
| Glycerol fatty acid monoester (HLB5) | 0.2% |
| Water | 72.2% |
| Skim milk powder | 7.0% |
| Alkali metal salts of phosphoric acid | 0.1% |

The results of the cream production in the above Examples are summarized and shown below. (In the following table, for example, 2'50" represents 2 minutes and 50 seconds.)

| Examples | 1 | 2 | 3 | 4 |
|---|---|---|---|---|
| Occurrence of thickening | None | None | None | None |
| Whipping time | 2'50" | 4'20" | 2'48" | 5'00" |
| Overrun | 105 | 110 | 158 | 160 |
| Shape retention | Good | Good | Good | Good |
| Flavor | Good | Good | Good | Good |
| Melting properties in a mouth | Good | Good | Good | Good |

EXAMPLE 5

A mixture of fractioned shea oil (melting point: 38° C.; 80 parts) and palm kernel oil (melting point: 32° C.; 20 parts) was used as an oil-and-fat feedstock for production of cream (*). This oil-and-fat feedstock contained 62.5% of SUS-type triglycerides and its solid fat content was 80% at 5° C. and 67% at 15° C.

According to the formulation as described below, a cream composition was produced.

| Formulation | |
|---|---|
| Oil-and-fat ingredients* | 15.0% |
| Soybean lecithin | 0.2% |
| Sucrose fatty acid ester (HLB11) | 0.2% |
| Sorbitan fatty acid ester (HLB5) | 0.2% |
| Water | 77.3% |
| Skimmed milk powder | 7.0% |
| Alkali metal salts of phosphoric acid | 0.1% |

EXAMPLE 6

A mixture of an oily ingredient (70 parts), which was a mid-fraction obtained by interesterification of high-oleic sunflower oil with ethyl stearate and ethyl laurate in the presence of lipase having 1,3-specificity, and coconut oil (30 parts) was used as an oil-and-fat feedstock for production of cream (*). This oil-and-fat feedstock contained 50.0% of SUS-type triglycerides and its SFC was 68% at 5° C. and 49% at 15° C.

| Formulation | |
|---|---|
| Oil-and-fat ingredients* | 30.0% |
| Soybean lecithin | 0.3% |
| Sucrose fatty acid ester (HLB11) | 0.3% |

| Formulation | |
|---|---|
| Polyglycerol fatty acid ester (HLB5) | 0.4% |
| Water | 62.4% |
| Skimmed milk powder | 6.5% |
| Alkali metal salts of citric acid | 0.1% |

EXAMPLE 7

A mixture of an oily ingredient (60 parts), which was a mid-fraction obtained by interesterification of high-oleic sunflower oil with ethyl behenate and ethyl octanoate in the presence of lipase having 1,3-specificity, and hardened palm kernel oil (40 parts) was used as an oil-and-fat feedstock for production of cream. This oil-and-fat feedstock contained 40.0% of SUS-type triglycerides and its SFC was 72% at 5° C. and 53% at 15° C.

| Formulation | |
|---|---|
| Oil-and-fat ingredients* | 25.0% |
| Soybean lecithin | 0.3% |
| Glycerol fatty acid monoester (HLB3) | 0.3% |
| Polyglycerol fatty acid ester (HLB16) | 0.4% |
| Water | 67.4% |
| Skimmed milk powder | 6.5% |
| Alkali metal salts of citric acid | 0.1% |

The results of the cream production in Examples 5–7 are summarized in the following table.

| Examples | 5 | 6 | 7 |
|---|---|---|---|
| Occurrence of thickening | None | None | None |
| Whipping time | 4'00" | 3'10" | 3'30" |
| Overrun | 162 | 135 | 120 |
| Shape retention | Good | Good | Good |
| Flavor | Good | Good | Good |
| Melting properties in a mouth | Good | Good | Good |

Comparative Example 1

A cream composition was prepared according to the same formulation as described in Example 1, except that palm mid-fraction (melting point: 34° C.; 100 parts) was only used as an oily ingredient. The content of SUS-type triglycerides was 82.0%, and the solid fat content (SFC) was 75% at 5° C. and 65% at 15° C. The cream composition broken its emulsion state and caused thickening immediately after cooling in the course of cream production.

Comparative Example 2

A cream composition was prepared according to the formulation as described in Example 3, except that a mixture of palm mid-fraction (melting point: 34° C.; 98 parts) and hardened coconut oil (2 parts) was used as oily ingredients. The content of SUS-type triglycerides was 80.7%, and the solid fat content (SFC) was 75% at 5° C. and 64% at 15° C. The cream composition broken its emulsion state and caused thickening immediately after cooling in the course of cream production.

Comparative Example 3

A cream composition was prepared according to the formulation as described in Example 4, except that a mixture of fractioned shea oil 29 parts) and palm kernel oil (melting point: 36° C.; 71 parts) was used as oily ingredients. The content of SUS-type triglycerides was 23.0%, and the solid fat content (SFC) was 68% at 5° C. and 59% at 15° C. The cream composition was not able to be whipped.

Comparative Example 4

A cream composition was prepared according to the formulation as described in Example 5, except that an inter-interesterified oil (100 parts) as described in Example 5 was only used as an oily ingredient. The content of SUS-type triglycerides was 63.0%, and the solid fat content (SFC) was 72% at 5° C. and 52% at 15° C. The cream composition had a strong tendency to cause thickening and was not able to be whipped.

EXAMPLE 8

A mixture of palm mid-fraction (melting point: 34° C.; 80 parts) and hardened coconut oil (20 parts) was used as an oil-and-fat feedstock for production of cream of Emulsion (A). This oil-and-fat feedstock contained 56.0% of SUS-type triglycerides.

According to the following formulation, Emulsion (A) was produced by mixing an oily phase prepared by addition of the emulsifying agents to the oil-and-fat feedstock and an aqueous phase prepared by adding milk solids and salts to water, pre-emulsifying the mixture with a high speed mixer at 70° C. for 20 minutes, homogenizing under pressure of 70 kg/cm$^2$ and sterilized by UHT at 145° C. for several seconds. Then, the emulsion was further homogenized under 70 kg/cm$^2$. Sterilized fresh cream the oily ingredient content of which had been adjusted to 45% was used as Emulsion (B). Emuslions (A) and (B) were mixed in the ratio of (A):(B) of 80:20 After cooling, the mixture was aged for about 24 hours to produce a low-oil cream composition. This low-oil cream composition did not cause thickening and had a good emulsified state. The whipping time was 2 minutes and 28 seconds and a whipped product having 121.8% of over-run was obtained. The product had good shape retention, good melting property in the mouth and excellent flavor and body as natural fresh cream.

| Formulation of Emulsion (A) | |
|---|---|
| Oil-and-fat ingredients* | 20.0% |
| Soybean lecithin | 0.3% |
| Diacetyl tartrate monoglyceride (HLB9) | 0.2% |
| Water | 72.8% |
| Skimmed milk powder | 6.6% |
| Alkali metal salts of citric acid | 0.1% |

EXAMPLE 9

According to the same formulation as Example 8, Emulsion (A) was produced by mixing an oily phase prepared by addition of the emulsifying agents to the oil-and-fat feedstock and an aqueous phase prepared by adding milk solids and salts to water, pre-emulsifying the mixture with a high speed mixer at 70° C. for 20 minutes and homogenizing under pressure of 70 kg/cm$^2$. According to the same manner as Example 8, Emulsion (B) was mixed with Emulsion (A) so that the mixing ratio of (A):(B) was 80:20 and the mixture was sterilized by UHT at 145° C. for several seconds. The mixture was further homogenized under 70 kg/cm$^2$. After cooling, the mixture was aged for about 24 hours to produce a low-oil cream composition. This low-oil cream composition did not cause thickening and had a good emulsified state. The whipping time was 2 minutes and 01 second and a whipped product having 125.0% of over-run was obtained. The product had-good shape retention, good melting property in the mouth and excellent flavor and body as natural fresh cream.

EXAMPLE 10

Emulsion (A) was obtained according to the same, formulation and manner as Example 8. And, the same Emulsion (B) as Example 8 was used. Emulsions (A) and (B) were mixed in the ratio of (A):(B) of 60:40. The mixture was sterilized by UHT at 145° C. for several seconds. Then, the mixture was further homogenized under 70 kg/cm$^2$. After cooling, the mixture was aged for about 24 hours to produce a low-oil cream composition. This low-oil cream composition did not cause thickening and had a good emulsified state. The whipping time was 1 minute and 37 seconds and a whipped product having 125.0% of over-run was obtained. The product had good shape retention, good melting property in the mouth and excellent flavor and body.

EXAMPLE 11

Emulsion (A) was obtained according to the same formulation and manner as Example 8. And, the same Emulsion (B) as Example 8 was used. Emulsions (A) and (B) were mixed in the ratio of (A):(B) of 50:50. The mixture was sterilized by UHT at 145° C. for several seconds and further homogenized under 70 kg/cm$^2$. After cooling, the mixture was aged for about 24 hours to produce a low-oil cream composition. This low-oil cream composition did not cause thickening and had a good emulsified state. The whipping time was 1 minute and 37 seconds and a whipped product having 125.2% of over-run was obtained. Although its shape retention was somewhat inferior to those of the low-oil cream compositions obtained in Examples 8 and 9, it had good melting property in the mouth and excellent flavor and body.

Comparative Example 5

Emulsion (A) was produced according to the same formulation as Example 8. However, before the pre-emulsification, the same Emulsion (B) as Example 8 was mixed with Emulsion (A) in the mixing ratio of (A:(B) of 80:20. The mixture was pre-emulsified with a high speed mixer at 70° C for 20 minutes and homogenized under pressure of 70 kg/cm$^2$. According to the same manner as Example 8, the mixture was sterilized and further homogenized to obtain a low-oil cream composition. This low-oil cream composition did not have good flavor and body of the products obtained in Examples 8 to 11 and it was difficult to whip the product.

Function

Although the precise mechanism of the phenomenon caused by mixing SUS-type triglycerides and a lauric-type oil-and-fat ingredient is unknown, the present inventors presume as follows. That is, SUS-type triglycerides are greatly different from lauric-type oil-and-fat ingredients in their crystallization rate and crystallizability. During a cooling step of a cream composition, a lauric-type oil-and-fat ingredient which shows rapid crystallization rate and fine crystal forms is firstly crystallized at an interface of oil and water. Then, coarse crystals of SUS-type triglycerides are formed on the lauric-type oil-and-fat so that they cover the lauric-type oil-and-fat ingredient. In a normal emulsion state, the emulsion is stable due to the fine crystals at the interface. However, strong mechanical agitation is once effected, the interface is readily broken to appear a layer of SUS-type triglycerides. This layer has excellent demulsifying property and good whipping property.

In addition, when an oil-and-fat feedstock containing SUS-type triglycerides and a lauric-type oil-and-fat ingredient is mixed with protein, water, an emulsifying agent and the like and, after emulsification, the emulsion is mixed with an emulsion containing milk fat such as fresh cream and the like, their oily particles are hardly integrated to each other. Therefore, it is possible with fully utilize their respective properties, i.e., such a property of the former that, when the strong mechanical agitation is once effected, a layer of SUS-type triglycerides which has good demulsifying property appears to show good whipping property, and such a property of the latter that it provides excellent flavor and body.

Effect of the Invention

As described hereinabove, according to the present invention, it is possible to obtain a low-oil cream composition which has similar foaming property as that of normal whipping cream having a high oily ingredient content, i.e., good over-run after the whipping, good capability of making artificial flowers, good shape retention, stability at room temperature as well as good flavor and melting properties in the mouth, even if it has a low oily ingredient content, and to obtain an oil-and-fat feedstock for production thereof.

In addition, when an emulsion containing milk fat is used, it is possible to produce a low-oil cream composition which has good flavor and body of fresh cream without deteriorating over-run after the whipping, excellent capability of making artificial flowers, shape retention, stability at room temperature and the like.

What is claimed is:

1. A process for production of a low-oil cream composition which comprises mixing an oily phase comprising an oil-and-fat feedstock comprising SUS-type triglycerides in an amount of at least 25% and a lauric-type oil-and-fat ingredient in an amount of from 5% to 60% by weight, based on the total weight of oil ingredients of the oil-and-fat feedstock, with an aqueous phase comprising milk solids to form a low-oil cream composition having an oily-ingredient content of at most 40% by weight based on the total weight of the composition, the solid fat content of said oil-and-fat feedstock being not less than 50% at 5° C. and not less than 40% at 15° C.

2. A process according to claim 1 wherein the milk solids as solids-non-fat is present in the composition in an amount of 3 to 8%, based on the total weight of the low-oil cream composition.

3. A process for production of a low-oil cream composition which comprises mixing
    (i) an emulsion of an oil-and-fat feedstock comprising sus-type triglyerides in an amount of at least 25% and a lauric-type oil-and-fat ingredient in an amount of from 5% to 60% by weight based on the total weight of oil ingredients of the oil-and-fat feedstock with
    (ii) a n emulsion containing in milk fat to form a low-oil cream composition having an oily-ingredient content of at most 40% by weight based on the total weight of the composition and being capable of being whipped to a whipping cream having good shape retention properties.

4. A process according to claim 1 wherein the low-oil cream composition is whipped to produce a whipped cream having good shape retention.

5. A process according to claim 1 wherein the solid fat content of the oil-and-fat feedstock is not less than 50% at 5° C. and not less than 40% at 15° C.

6. A process according to claim 3, wherein the solids-non-fat content of the emulsion of the oil-and-fat feedstock is 3 to 8% by weight based on the total weight of the emulsion.

7. A process according to claim 3, wherein the emulsion containing milk fat is fresh milk.

8. A process according to claim 3, wherein both emulsions are mixed so that the content of SUS-type triglycerides is at least 20% by weight, the content of the lauric-type oil-and-fat is 5 to 60% by weight and the content of milk fat is 5 to 25% by weight based on the total weight of the oily ingredients of the composition.

* * * * *